April 13, 1965    R. T. FITZGERALD ETAL    3,178,712
ANTI-COLLISION SYSTEM
Filed Sept. 14, 1960    3 Sheets-Sheet 1

INVENTORS,
ROBERT T. FITZGERALD
KLAUS H. SANN
BY S. J. Rotondi, A. J. Dupont,
F. E. McGee & J. D. Edgerton
ATTORNEYS April 13, 1965 R. T. FITZGERALD ETAL 3,178,712
ANTI-COLLISION SYSTEM
Filed Sept. 14, 1960 3 Sheets-Sheet 3
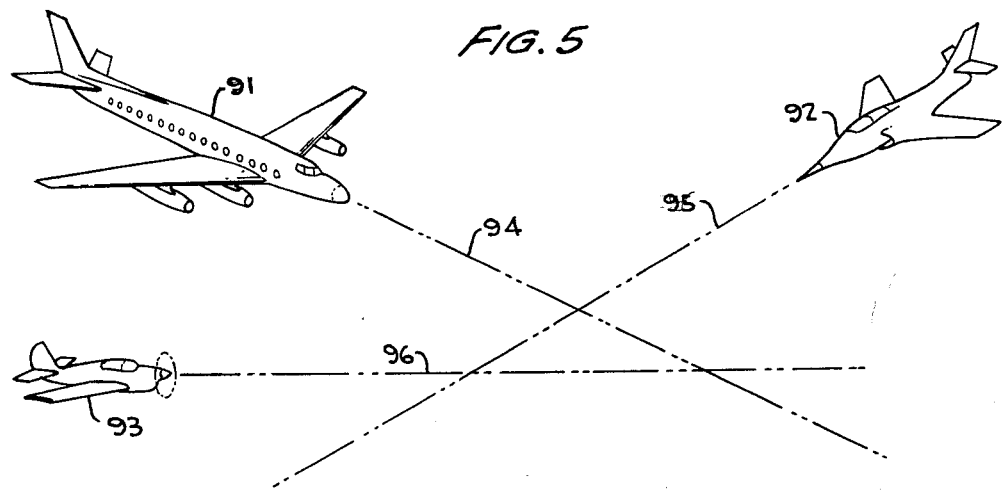
FIG. 5
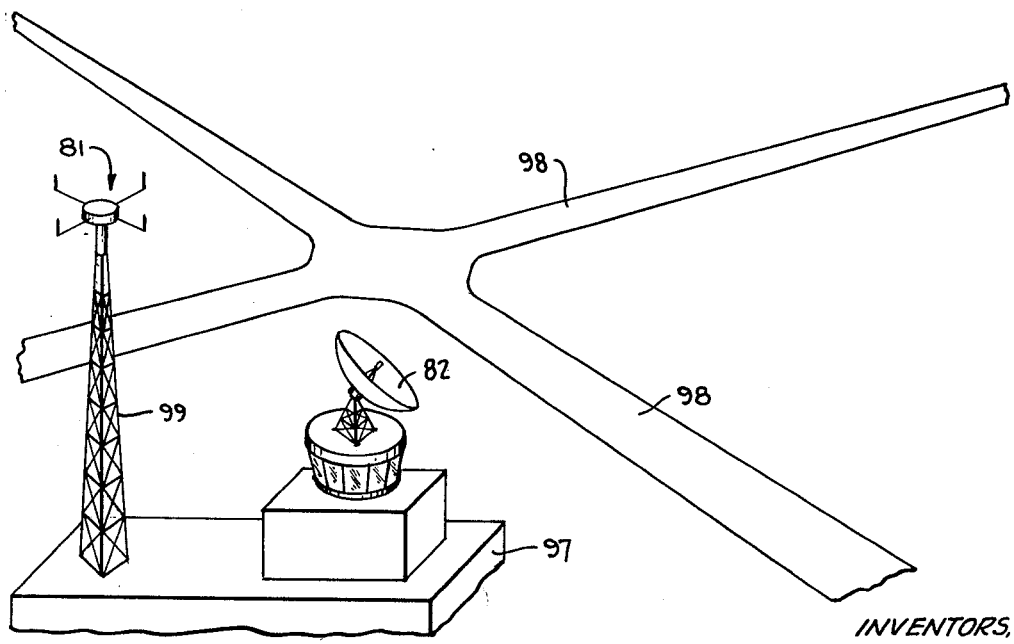
INVENTORS,
ROBERT T. FITZGERALD,
KLAUS H. SANN
BY S. J. Rotondi, A. J. Dupont,
F. E. McGee & J. D. Edgerton
ATTORNEYS United States Patent Office 3,178,712
Patented Apr. 13, 1965

3,178,712
ANTI-COLLISION SYSTEM
Robert T. Fitzgerald, Rockville, and Klaus H. Sann, Kensington, Md., assignors to the United States of America as represented by the Secretary of the Army
Filed Sept. 14, 1960, Ser. No. 56,069
9 Claims. (Cl. 343—101)
(Granted under Title 35, U.S. Code (1952), sec. 266)

The invention described herein may be manufactured and used by or for the Government for governmental purposes without the payment to us of any royalty thereon.

This invention relates to communication systems, and, more particularly, to systems of communication between moving vehicles for preventing collisions therebetween.

As both the aircraft traffic density and aircraft speeds increase, the rate of in-air collisions of military, passenger and private airplanes is increasing and will undoubtedly increase still more. Modern methods of communications, such as radar and other navigation aids, have improved the ability of pilots to rapidly and easily traverse the earth; however, much of the safety of the aircraft still depends upon the sight of the crew, and, with the higher speeds of jet and jet-propeller propulsion, this ability is rapidly being curtailed. Radar is a great help, but it is expensive. Also, the radar system requires constant surveillance, and this is impossible in present aircraft with the large number of controls and gauges already requiring the attention of the pilot.

There is, then, a need for a means of informing the pilots of approaching aircraft of the danger of impending collision. This information must be presented in sufficient time to enable the pilots to execute suitable avoiding maneuvers. Preferably, the means should provide an aural signal to attract the pilot's attention, and, then, visually display the direction from which the impending danger is arriving.

Studies have shown that the best type of collision avoidance system for aircraft is the cooperative system wherein each aircraft informs the others of its presence. Such systems may be based upon the concept of lanes or channels within the air space, each lane separated from the others by altitude. In such a system, each plane would transmit to others its altitude, and receive altitude information from the others. Only when one aircraft came within a prescribed vertical distance of another would any warning be given. The higher craft would then rise, and the lower craft descend to avoid collision. Simultaneous maneuvers would, of course, be made when and if the pilots of both planes became aware of the existence of the other. However, the first pilot to become aware of danger would execute a maneuver to relieve the danger. This system, of course, anticipates that each plane will always be able to execute a vertical maneuver. However, this situation is not always true, particularly at low altitudes or in heavily populated areas such as the approaches to an active terminal.

To accommodate those situations where vertical maneuvers may not be feasible, heading information should also be provided so that horizontal maneuvers may be executed. In addition, where speeds are high and time is short, an aircraft which can maneuver both horizontally and vertically is safer. To be able to execute such moves, information of the location and heading of the approaching aircraft, as well as its altitude, is necessary.

Prior art systems proposed for avoiding collisions among approaching aircraft have suggested the transmission of either altitude or heading information. As explained, this seriously limits the usefulness of such systems. In addition, most systems heretofore proposed were intermittent in operation. The transmission of information was interrupted during the periods when comparisons of received and transmitted signals were being made. In other words, the transmission of information in prior art systems was not continual and took place during only a portion of the time that the aircraft were airborne.

It is, therefore, an object of this invention to provide new and improved communication systems.

It is another object of this invention to provide new and improved information systems for moving vehicles.

It is a further object of this invention to provide new and improved communication systems for aiding in the avoidance of collision among moving vehicles.

Other objects and advantages of this invention will become apparent as the following description proceeds, which description should be considered together with the accompanying drawings in which:

FIG. 5 is a pictorial illustration of air and ground installations using the system of this invention.

Figure 1:
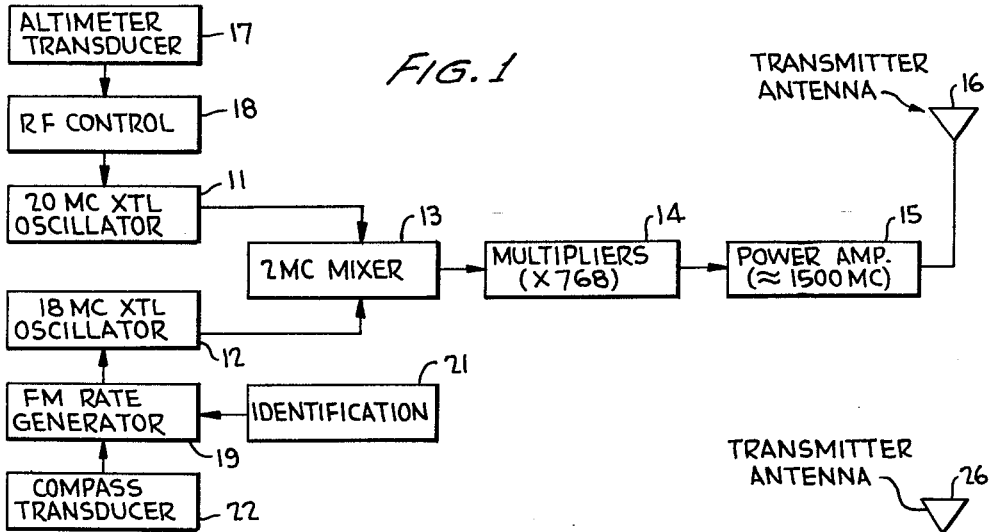
FIG. 1 is a block diagram of a radio transmitter for use in the system of this invention.

Referring now to the drawings in detail, and more particularly to FIG. 1, the reference character 11 designates a crystal controlled oscillator of a first frequency, shown here by way of illustration as 20 megacycles per second. A second crystal controlled oscillator 12 has a second resonant frequency slightly different from that of the first oscillator 11, say 18 megacycles per second. The outputs from the two oscillators 11 and 12 are mixed, or heterodyned, in a mixer 13 to produce the difference frequency (2 megacycles per second in this case). The difference frequency is then multiplied in suitable frequency multipliers 14, amplified by a power amplifier 15 and applied to an omnidirectional antenna 16 for radiation into space. Although crystal controlled oscillators are generally considered fixed in frequency, they may be varied in frequency by as much as ±0.25%. An altimeter transducer 17 controls a circuit for modifying the frequency of the oscillator 11.

With the apparatus so far described, any variation in the frequency of the oscillator 11 is unchanged when the outputs of the two oscillators are mixed, but the resultant frequency output of the mixer 13 is much lower than that of either input. Therefore, during the multiplication of the frequency of the output of the mixer 13 by the frequency multipliers 14, not only is the basic frequency of the signal multiplied, but so, also, is any variation in that frequency due to the altimeter transducer output. If, as indicated on FIG. 1, the output of the mixer is 2 mc./s. and is multiplied by the multipliers 768 times, the input frequency to the amplifier 15 is 1536 mc./s. Varying the frequency of the oscillator 11 the maximum amount in the direction to increase frequency, for example, results in a change in the frequency of the oscillator of 0.05 megacycles per second. The output of the mixer 13 will then be 2.05 megacycles per second, and the input to the amplifier 15 will be 1574.40 megacycles per second. Thus the original +0.25% variation in frequency has been increased to about 2.5% variation. Changes in the frequency of the oscillator in the opposite direction result in similar variations.

In addition to a variation in the frequency of the oscillator 11 in proportion to changes in altitude of the transmitter, the oscillator 12 is frequency, phase, or otherwise modulated by a modulation rate generator 19. The output of the generator 19 is dependent upon the output of a compass transducer 22 and corresponds to the angular deviation of the direction of flight of the aircraft from north. The oscillator 12 has its frequency varied at a rate which is dependent upon the heading. Again, the operation of the mixer 13 and the multiplier 14 serve to greatly increase the effective frequency variations produced in the oscillator 12.

The signal radiated from the antenna 16 has a basic frequency of about 1500 megacycles per second. This basic frequency is modified by the altitude at which the craft is flying to produce a new average frequency which, in turn, is frequency modulated at a rate determined by the heading. A range of frequencies of modulation found suitable extends from about 1,000 to 10,000 cycles per second, or over a frequency interval of about 10 to 1. Other ranges, such as 500–5000 c.p.s., are also satisfactory.

Figure 2:
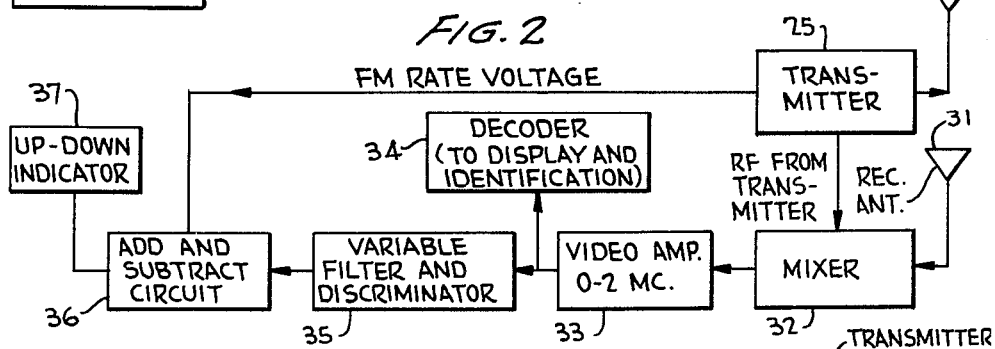
FIG. 2 is a block diagram of a radio receiver for use in the system of this invention.

FIG. 2 illustrates a receiver for receiving information transmitted by the equipment described above. A receiving antenna 31 intercepts signals from other aircraft within the range of the equipment and transmits such signals to one input of a mixer 32. The mixer 32 also receives some of the energy from the transmitter 25 which is being transmitted into space by antenna 26. The mixer 32 is preferably, but not necessarily, a balanced mixer and there is also, preferably, a directional coupler in the transmission path from the transmitter 25 to the antenna 26 to prevent the coupling of signals received by the antenna 26 to the mixer 32. This avoids some unwanted modulation in mixer 32. The output of the mixer 32 is applied through a video amplifier having a sufficiently wide pass band to accommodate the complete signals from a plurality of aircraft, to a decoder and display device 34 and also to a variable filter and discriminator circuit 35. The detected FM output from the filter and discriminator circuit 35 is applied to an add and subtract circuit 36 together with a portion of the modulation frequency applied to the carrier in the transmitter 25. The results of the addition and subtraction accomplished in the circuit 36 are supplied to a visual-audio indicator 37 which indicates the presence of approaching aircraft and the direction of a vertical avoiding maneuver.

In operation, the signal received on antenna 31 is heterodyned in mixer 32 with a portion of the signal which is being transmitted by antenna 26. Thus, the signal containing information of intruder aircraft is mixed, or beat, with the signal containing information of the home aircraft. Since the average frequency of transmission, in both cases, is proportional to the altitude of the transmitting equipment, the mixing produces an output which is the difference between the two signals; a signal whose average frequency is proportional to the difference in the altitude between the intruder aircraft and the home aircraft. This difference signal is amplified in the video amplifier 33 and applied to a variable filter and discriminator 35 which determines when the difference frequency lies within prescribed limits. When such a situation is detected, the altitudes of the two aircraft are too close and a collision is possible. An alarm is sounded to alert the pilot.

The output from the video amplifier is not a simple, single frequency signal, but is actually a signal having an average frequency which is proportional to the difference in altitude between the aircraft and is frequency modulated by a signal which represents the super-positions of the heading modulation signals of the aircraft. The discriminator 35 detects the frequency modulated signal to derive the heading information therefrom. But since the average frequency of the output from the mixer 32 is determined by the difference in altitude between the two aircraft a variable, scanning filter is incorporated with the discriminator 35 to permit scanning the range of possible frequencies, and the detection of any signal within that range. As the filter-discriminator circuit 35 sweeps its response through the frequency of the signal output from the mixer 32, an output is derived and applied to the add-subtract circuit 36. The output from the discriminator 35 is a complex wave due to the interaction of the several signals which were mixed in the mixer 32. The wave comprises a first low frequency signal which is the detected rate of the frequency modulation of the home aircraft and a second low frequency wave, which is the detected rate of the frequency modulation of an intruder aircraft, superimposed thereon. This complex wave represents the information-bearing components not filtered in prior circuits. From the outputs of the discriminator 35 and the add-subtract circuit 36, the aircraft having the higher altitude can be determined. If the signal from the intruder aircraft is higher in radio-frequency than that of the home aircraft, then the detected signal from the discriminator 35 will have a first polarity with respect to the home aircraft rate of modulation signal, but if the signal from the approaching ship is lower in radio frequency, then the output from the discriminator 35 will differ by 180° from said first polarity. The low frequency component of the output from the discriminator 35 will have a frequency of the same order as that used to determine the rate of frequency modulation on the home ship. Therefore, by algebraically adding the two signals, a determination can be made of the higher aircraft. In the add-subtract circuit 36, the signal from the home transmitter is split into two signals which are in phase opposition, and the two signals are individually added to the output from the discriminator 35. One such addition will substantially eliminate the home aircraft generated portion of the composite superimposed waves and the other addition will substantially double that portion.

Figure 3:
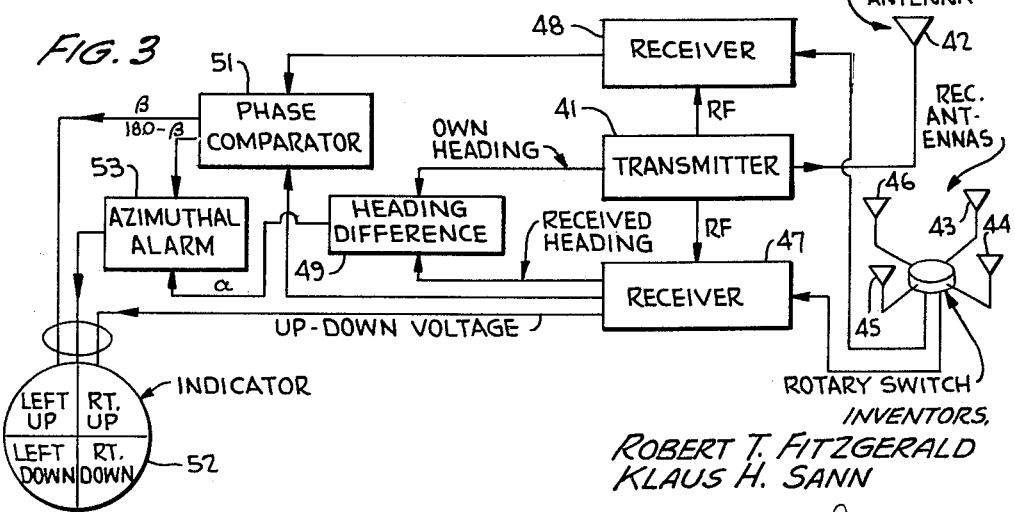
FIG. 3 is a block diagram of the overall system of this invention.
Figure 4:
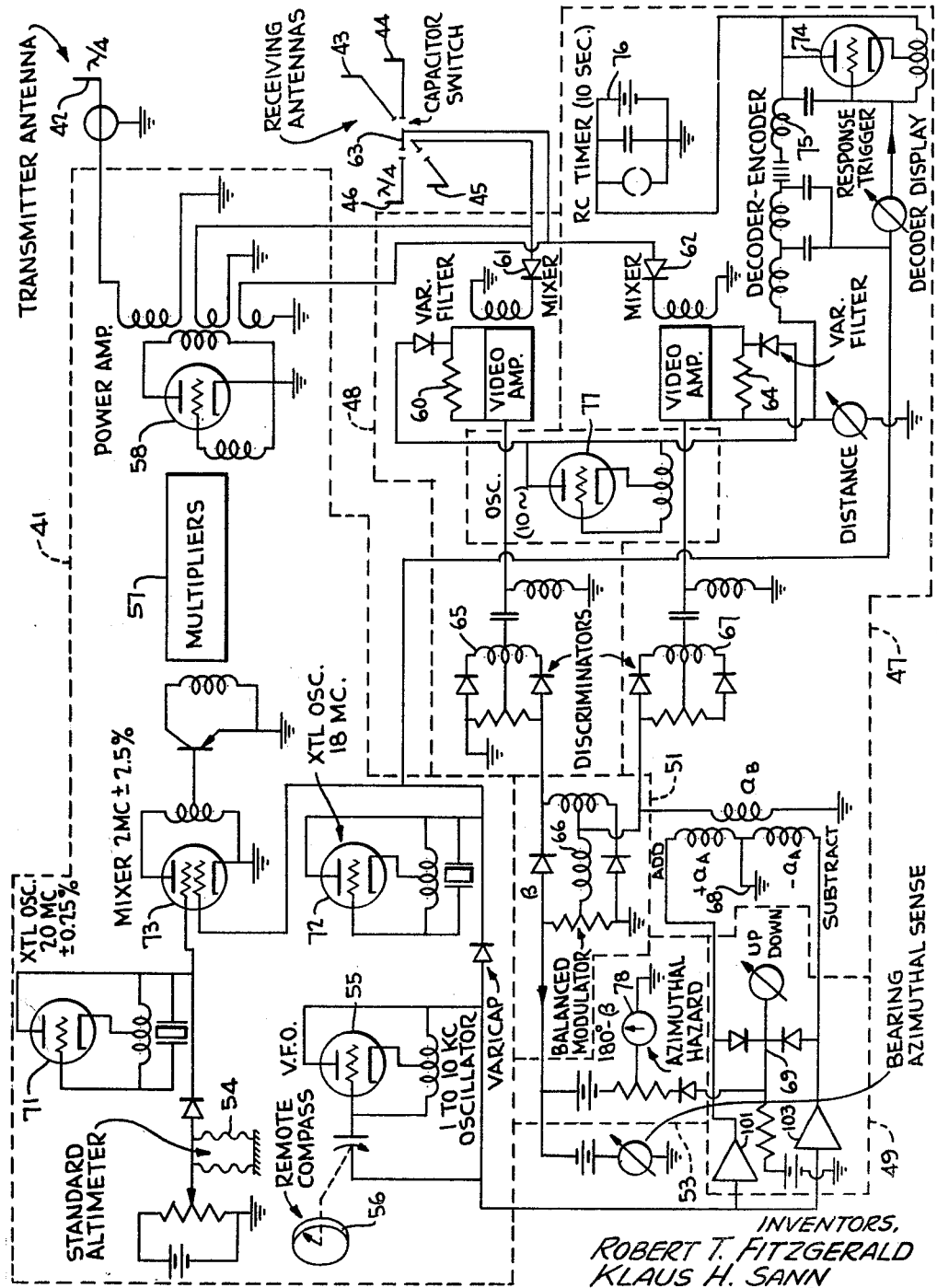
FIG. 4 is a simplified schematic diagram of the system of this invention.

A complete assembly for aircraft and other vehicles, is illustrated in block form in FIG. 3 and in simplified schematic form in FIG. 4. In FIG. 3 a transmitter 41 of the type illustrated in FIG. 1 and described above transfers high frequency energy containing altitude and heading information to an antenna 42 for radiation into space. Four spaced receiving antennas 43, 44, 45, and 46 are intermittently connected by a rotating capacitor or other high frequency switch to each of two receivers 47 and 48. Each of the receivers, 47 and 48, also receives energy from the transmitter 41, and the two signals in each receiver are heterodyned in a manner heretofore described. The output from receiver 48 is applied to a phase comparator as is the output from receiver 47. In addition, the receiver 47 applies its output to a heading difference detector 49 to which heading information from the transmitter 41 is also applied. The heading difference detector 49 determines the difference and the sense of the difference between the rates of modulation of the intruder and home aircraft. The phase comparator 51 has two voltage outputs proportional to bearing angle and 180° minus bearing angle. One of these outputs is applied to the visual indicator 52, and the other output is applied to an azimuthal alarm 53 together with the output from the heading difference detector 49.

It has been determined that when the speeds of two approaching aircraft at the same altitude are equal, collision will occur if the difference in the headings of the two aircraft is equal to 180° minus twice the relative bearing angle. The bearing angle is the angular displacement from the heading of one aircraft to the line-of-sight of the other. Since two approaching aircraft are seldom flying at the same speeds, and since it is difficult to secure heading and bearing information without error, a safety factor must be provided. This may be accomplished by indicating a maneuver whenever the difference in the headings between the two aircraft is less than 180° minus $n$ times the bearing, where $n$ is the necessary factor of safety. In this case, $n$ is chosen as 1, but may be any number from 0 to 2. A more complete discussion of relative bearing and collision courses is set forth in "Radio Collision Avoidance Systems for Aircraft," by R. T. Fitzgerald et al., published by Diamond Ordnance Fuze Laboratories, Ordnance Corps, Department of the Army, Washington 25, D.C., September 15, 1959.

In operation, the signals received by the individual receiving antennas 43–46 have differing phase relations, depending upon the direction from which the received signal comes. The outputs of the individual antennas are applied intermittently and in sequence to each of the two receivers 47 and 48 by means of the rotating switch so that at any time a pair of adjacent antennas are coupled to the two receivers. Each of the receivers 47 and 48 heterodyne the received signal and that from the transmitter 41. In each receiver 47 and 48 the signals representing the rate of modulation by the intruder aircraft equipment is recovered, and is applied to the inputs of the phase comparator 51. The inputs to the two receivers are, at any moment, from two different but adjacent antennas, 43–44, 44–45, 45–46, or 46–43. Thus, the signals applied to the two receivers from the receiving antennas are always out of phase by an angle less than 90°, but the signals applied to both receivers from the transmitter 41 are always in phase. From this relationship, a phase comparator will produce an indication of the relative direction from which the received signal is transmitted. This type of direction finder is quite well known at this time, and does not, in itself, form a part of this invention.

One of the two outputs from the phase comparator 51 is applied to the azimuthal alarm 53 together with the output from the heading difference detector 49. In the azimuthal alarm, the two signals are compared in amplitude, and if the amplitude difference is less than a prescribed amount, based upon mean possible errors in the system, a collision course is indicated, and an audible alarm is sounded. The output from the azimuthal alarm 53 serves as one of the inputs to the visual indicator and determines when a maneuver is required. The quadrant either toward which a maneuver should take place or from which the other aircraft is approaching is determined by the bearing output from the phase comparator 51. The visual indicator 52 receives bearing information from the phase comparator 51 and horizontal maneuver information from the azimuthal alarm 53, and it receives altitude information from receiver 47, to produce an indication based upon heading, bearing and altitude. One preferred form of operation of the indicator 52 is to indicate the direction or quadrant into which a maneuver should take place, in other words, indicate the safest quadrant for the ship under possible collision conditions. Another mode of operation is to produce an indication of the direction from which the danger is approaching and permit the pilot to decide upon the safest course of action to avoid danger. Much can be said for both indications, but the actual operation of the device is essentially the same in both cases.

In FIG. 4, the transmitter 41 comprises a first crystal controlled oscillator 71 and second crystal controlled oscillator 72, the outputs of which are heterodyned in a mixer 73. The output signal of the oscillator 71 is controlled within limits by the setting of an altimeter 54, and the second oscillator 72 has its frequency varied by the output of a variable frequency oscillator 55, the rate at which the output of the variable frequency oscillator 55 varies is controlled by a compass, which may be of any well known type. The resulting output from the oscillator 72 is a wave which is frequency modulated at the output frequency of the variable frequency oscillator 55, and at rate which is determined by the setting of the compass 56. The output from the mixer 73 is a comparatively low frequency wave, the frequency of which is partially determined by the setting of the altimeter 54 and which is frequency modulated at a rate which is determined by the sitting of the compass 56. This comparatively low frequency wave is frequently multiplied in the multipliers 57, and, after amplification, is applied to the antenna 42 for radiation into space.

A portion of the signal radiated into space by the antenna 42 is also applied to each of two mixers 61 and 62. Radio frequency energy received by the antennas 43–46 is also applied, through rotating capacitor switch 63, to each of the mixers 61 and 62 which are merely representative of balanced or other suitable types of mixers. The outputs from the two mixers 61 and 62 are applied to individual video amplifiers 60 and 64, which are also diagrammatically shown. The output from the video amplifier 60 is applied to a frequency discriminator 65 which recovers the modulation from the beat frequency output of the mixer 61. This recovered modulation is mixed in a balanced modulator 66 with the output from a discriminator 67, in which the recovered modulation of the beat signal output from mixer 62 is obtained. The resultant output from the balanced modulator 66 contains information of the azimuth from which danger approaches. In addition, the output from the discriminator 67 is applied to a phase splitter 68 to develop two signals which are 180° out of phase. Heading information is applied to both sides of an up-down circuit 69 from the output of the oscillator 55, to produce an indication of the relative elevation of the approaching ship. The output from the balanced modulator 66, together with the two outputs from the up-down circuits 69, are applied to an azimuthal hazard indicator 78 and to a bearing sense indicator 79. Together, the bearing sense indicator 79 and the up-down circuit 69 constitute the quadrant indicator of FIG. 3. In those cases where two aircraft are transmitting at the same average radio frequency, the altitude sense is lost. To correct this situation, the first installation to recognize this fact will switch its output average frequency by a fixed amount. Such a recognition is possible since there is always a frequency difference between the transmitted signals due to the frequency modulation.

In addition, an encoder unique to each aircraft and comprising a pulse generator 74 driving a tapped delay line 75 is included. The spacing of the taps on delay line 75 determines the spacing of a serial pulse code which identifies the individual aircraft. The pulse generator 74 is periodically triggered by a timer 76 to provide intermittent transmission of the code. It is sometimes desirable to have individual aircraft addressed from ground installations, and the code may be transmitted for this purpose. A ground installation receives a code signal, then retransmits that code signal. Only the aircraft having the delay line with the requisite tap arrangements will respond to the retransmitted code signal. In addition, such a retransmission may be used to control the repeated code generation on board the aircraft, the time of response can be used to determine the distance of the aircraft from the ground installation and to selectively transmit encoded commands to a particular aircraft.

For illustration purposes, a very low frequency oscillator 77 may be used to sweep the narrow pass band of the tuned video oscillators 60 and 64 through the entire range of frequencies to identify individual intruders of a plurality of intruders transmitting information at slightly different average frequencies. The oscillator 77 may control the frequency response of a wien bridge, a twin-T filter, or the like, or mechanical sweep equipment may be used.

The manner in which the system of this invention may be used can be explained by reference to FIG. 5 which illustrates a transport aircraft 91, a military aircraft 92, and a private aircraft 93, all in flight. The transport 91 is proceeding along a line-of-flight 94 which will intersect with the line-of-flight 95 of the descending military airplane 92 and the line-of-flight 96 of the level flying private craft 93. A ground installation represented by runways 98 and an air traffic control facility 97, manned or unmanned, and topped by a radar antenna 82, has a tower 99 supporting a group of spaced receiving antennas 81.

An anti-collision system for vehicles must be designed to meet the primary needs of all types of vehicles which are to be protected. In the situation illustrated in FIG. 5, the primary consideration of most private aircraft, such as that at 93, is expense. The least expensive components or systems necessary for the public safety would be preferable for the majority of private aircraft. In the present system, the private airplane 93 would carry only a transmitter of the type illustrated in FIG. 1. By this means, the plane 93 makes its presence known as it proceeds into airspace occupied by other ships. Probably the greatest consideration in military aircraft is the weight of additional equipment. The military ship 92 would be equipped with the transmitter and single channel receiver illustrated in FIG. 2, in the system of this invention. Since the higher speeds and great maneuverability of military ships allows them maximum use of air space, a greater responsibility for the safety and protection of other aircraft rests upon them than upon the slower and less agile small private airplane, and the military ship must have receiving equipment to indicate possible collision paths. Since the primary consideration in transport 91 would be equipped with the complete transmitter and two-channel receiver illustrated in FIGS. 3 and 4. The ground station 97 contains a panoramic receiver having a visual display means for indicating the relative altitudes, bearing, distances, and headings of all aircraft within the range of its equipment and a command transmitter for automatically addressing individual aircraft by their individual codes which are periodically transmitted and received at the ground installation. Since the ground station is not in flight, it need not broadcast any altitude or heading information. Should the ground station personnel become aware of a possible collision course of two aircraft, it could communicate by automatic radio code with the pilots of both aircraft and warn them of the danger.

Assume the individual airplanes of FIG. 5 were equipped as suggested above. Although the private plane 93 may not be aware of the existence of the other planes unless its pilot sees them, it makes its presence known to them by the heading and altitude information it transmits. This information is received by the equipment in both the transport 91 and the military ship 92, and compared with the information being transmitted by their transmitters. The pilot of the military ship is informed that he is proceeding on a possible collision course and that a maneuver upwardly is indicated. As he maneuvers, he becomes aware of the transport also, and when the original course has been changed to avoid possible collision with the private plane 93, a new maneuver may be indicated. The transport 91 is able to determine not only the relative heading of the other aircraft, and their relative altitudes, but also their bearing with respect to itself. The pilot of the transport 91, is therefore able to place the other ships 92 and 93 with respect to himself, and to possibly anticipate the maneuvers of the military craft 92. In the meantime, the ground station 97 receives information from all three of the aircraft 91-93 and displays their relative locations on a visual display. If it appears that simultaneous maneuvers may cancel each other and endanger all of the aircraft, air traffic control may take over and direct the maneuvers by automatic radio code which would take procedence over plane-to-plane communication. The anti-collision system described herein supplements the information derived at the ground station by radar, by supplying relative altitude and heading information, which is not readily obtainable with the expensive radar equipment.

This specification has described a new communication system for moving vehicles, particularly for aircraft, which system provides information of possible collision courses. The system is adaptable to the particular type of vehicle and ground station in which it is to be used, and is sufficiently versatile to meet the primary needs of each kind of vehicle. It is realized that the above description may suggest to those in the art other ways of using this invention, and it is, therefore, intended that this invention be limited only by the scope of the appended claims.

What is claimed is:

1. An anti-collision warning system for moving vehicles, said system comprising a first crystal controlled oscillator, means for controlling the frequency output of said first oscillator in proportion to the altitude of said oscillator, a second crystal controlled oscillator having an output frequency slightly different from that of said first oscillator, means for frequency modulating said second oscillator with a fixed frequency signal, means for modifying the rate of modulation of said second oscillator in proportion to the amount of deviation from a prescribed direction of the direction of movement of the moving vehicle upon which said second oscillator is mounted, means for heterodyning the outputs from said first and second oscillators, means for multiplying the frequency of the output from said heterodyning means, and means for radiating the frequency multiplied signal into space.

2. The system defined in claim 1 further including means for receiving energy radiated into space from other vehicles, a mixer circuit, means for applying to said mixer circuit energy received from other vehicles, means for applying to said mixer circuit a portion of said multiplied signal, means for demodulating the output from said mixer circuit, a phase splitter, means for applying to said phase splitter energy from said second oscillator, the output from said phase splitter comprising two signals in phase opposition, means for combining the output from said mixer circuit with each of said two signals, and means for indicating which of the two resulting outputs from said combining means has the lower altitude.

3. An anti-collision system for moving vehicles, said system comprising a transmitter for generating a high frequency signal, first means for continuously modifying said high-frequency signal in a first manner in proportion to the altitude of said moving vehicle, second means in said transmitter for continuously frequency modulating said high-frequency signal at a rate which is proportional to the amount of deviation in the motion of said moving vehicle from a predetermined direction, third means for periodically modifying said high-frequency signal in a third manner with an identification signal unique to the individual transmitter, and means for radiating said thrice-modified high-frequency signal into space.

4. The system defined in claim 3 further including a first receiver, said first receiver comprising a plurality of means for receiving modified high-frequency signals transmitted from a plurality of moving vehicles, a first mixer circuit in said first receiver, means for connecting each of said plurality of receiving means to an input of said first mixer individually and in sequence, means for applying a portion of said radiated high-frequency signal from said transmitter to an input of said first mixer, a tuned amplifier connected to the output of said first mixer for receiving the beat output signal therefrom, said beat output signal having a component proportional to the difference in altitude between the moving vehicles supplying the input to the output of said amplifier for demodulating said beat signal, first and second adder circuits, means for applying signals thereto, a first frequency discriminator connected the output from said first frequency discriminator to said first and second adder circuits, means for phase splitting a signal representing said rate of frequency modulation of said high-frequency signal, means for applying one of said phase split signals to said first adder circuit and means for applying the other of said phase split signals to said second adder circuit, and means for indicating which of the outputs from said first and second adder circuits is the smallest.

5. The system defined in claim 4 further including a second receiver, said second receiver comprising a second mixer, means for connecting each of said plurality of receiving means to an input of said second mixer individually and in sequence, different but adjacent receiving means being connected to said first and second mixers at any time, means for applying a portion of the radiated signal from said transmitter to another input of said second mixer, a second tuned amplifier for receiving the beat output signal from said second mixer, a second discriminator for demodulating said beat signal output from said second amplifier, phase comparator means having a first input connected to the output from said first discriminator and a second input connected to the output from said second discriminator for comparing the phase relationships of the signals from said first and second discriminators, said phase relationships being determined by the relative direction from which the signals received by said receiving means arrive, and indicator means connected to the outputs from said phase comparator and said first and second adder circuits for indicating the relative altitude and bearing of an approaching vehicle.

6. The system defined in claim 3 further including a receiver for receiving modified high-frequency signals from a plurality of moving vehicles, tuning means within said receiver for passing the received high-frequency signals lying within a narrow range of frequencies at any time, means for modifying the tuning of said tuning means to sweep said tuning means periodically through the entire pass band of said receiver, means for recovering from individual received high-frequency signals information defining the altitude and the direction of motion of the source of said received signals, and means for visually displaying the recovered information from a plurality of moving vehicles.

7. An anti-collision system for moving vehicles, said system comprising means for continuously generating a substantially constant high-frequency electrical signal, means responding to changes in altitude for modifying the frequency of said signal, said altitude responsive means mounted on a moving vehicle, a second means for generating an oscillatory signal, modulation means for continuously frequency modulating said high frequency signal with said oscillatory signal, means mounted upn said moving vehicle for continuously modifying the rate of said frequency modulation in proportion to the amount of deviation of the motion of said moving vehicle from a prescribed direction, means for radiating the frequency modulated signal into space, means for receiving from space frequency modulated signals radiated by other moving vehicles, said receiving means comprising a mixer, means for applying said received information to said mixer, and means for applying a portion of said frequency modulated signal to said mixer to obtain an output signal which has a frequency proportional to the difference in altitude between said transmitter and the vehicle from which said received energy is transmitted.

8. Anti-collision system for moving vehicles which is carried inside the vehicle, said system comprising carrier wave generator means for generating a high frequency signal, altitude sensing means connected to said carrier wave generating means for continuously modifying said high-frequency signal in proportion to the altitude of the vehicle in which said system is located, vehicle bearing sensing means connected to said carrier wave generator means for continuously modifying the modified high-frequency signal in proportion to the amount of deviation of said vehicle from a prescribed course, code generating means connected to said carrier wave generating means for further periodically modifying said twice-modified signal with an identifying code signal which is unique to the vehicle in which the system is located, and antenna means connected to said carrier wave generating means for radiating said thrice-modified high-frequency signal into space.

9. The system defined in claim 8 further including receiving means located in the same vehicle as said carrier wave generating means for receiving suitably modified signals radiated from other moving vehicles, said receiving means comprising a mixer for mixing the signals received from another moving vehicle with said thrice-modified signal to produce signals having a component proportional to the difference in altitude between the vehicle from which the received signal emanated and the vehicle carrying the system, detector means connected to said mixer for detecting said recovered signal, a first adder circuit and a second adder circuit, conductor means for applying the output from said detector means to said first and second adder circuits, said conductor means comprising first translating means for applying a signal proportional to said detector output to said first adder circuit and second translating means for applying a signal proportional to minus said detector output to said second adder circuit, and indicating means for indicating which adder circuit produces the larger output.

References Cited by the Examiner

UNITED STATES PATENTS

| 2,403,603 | 7/46 | Korn | 343—112 |
| 2,568,568 | 9/51 | Stansbury | 250—2 |
| 2,933,726 | 4/60 | Campbell et al. | 343—112 |
| 2,980,908 | 4/61 | Vielle | 343—112 |

FOREIGN PATENTS 835,185  5/60  Great Britain.

OTHER REFERENCES

IRE Transactions on Aeronautical and Navigational Electronics, vol. ANE–7, No. 2, June 1960, pages 40–54 incl. relied on.

CHESTER L. JUSTUS, *Primary Examiner.*